(12) United States Patent
Eaton et al.

(10) Patent No.: US 7,582,708 B2
(45) Date of Patent: Sep. 1, 2009

(54) BULK POLYMERIZATION REACTOR METHODS

(75) Inventors: Gerald B. Eaton, Houston, TX (US); Patrick Trainor, Surrey (GB)

(73) Assignee: Beta Technologie AG, Bern (CH)

( * ) Notice: Subject to any disclaimer, the term of this patent is extended or adjusted under 35 U.S.C. 154(b) by 573 days.

(21) Appl. No.: 10/170,785

(22) Filed: Jun. 12, 2002

(65) Prior Publication Data

US 2002/0192133 A1 Dec. 19, 2002

Related U.S. Application Data

(60) Provisional application No. 60/297,931, filed on Jun. 13, 2001.

(51) Int. Cl.
*C08F 2/00* (2006.01)
*B01J 10/00* (2006.01)
*B01J 12/00* (2006.01)

(52) U.S. Cl. .......................... 526/63; 422/129
(58) Field of Classification Search .................. 526/63; 422/129

See application file for complete search history.

(56) References Cited

U.S. PATENT DOCUMENTS

| | | |
|---|---|---|
| 3,140,277 A | 7/1964 | Coover et al. |
| 3,143,537 A | 8/1964 | Edwards et al. |
| 3,146,224 A | 8/1964 | Coover et al. |
| 3,216,935 A | 11/1965 | Morway et al. |
| 3,230,208 A | 1/1966 | Coover et al. |
| 3,257,332 A | 6/1966 | Briel et al. |
| 3,284,427 A | 11/1966 | Coover et al. |
| 3,299,024 A | 1/1967 | D'Alelio |
| 3,309,346 A | 3/1967 | Coover et al. |
| 3,309,347 A | 3/1967 | Coover et al. |
| 3,401,157 A | 9/1968 | Coover |
| 3,489,736 A | 1/1970 | Fujimaki et al. |
| 3,496,157 A | 2/1970 | Cernia et al. |
| 3,496,158 A | 2/1970 | Fisher et al. |
| 3,506,616 A | 4/1970 | Wolf |
| 3,507,845 A | 4/1970 | Hornbaker |
| 3,560,593 A | 2/1971 | Hsieh |
| 3,586,657 A | 6/1971 | Casey |
| 3,607,692 A | 9/1971 | Sanner et al. |

(Continued)

FOREIGN PATENT DOCUMENTS

CA 2020375 1/1991

(Continued)

OTHER PUBLICATIONS

Pearce et al., "Laboratory Experiments in Polymer Synthesis and Characterization", pp. 33-35 (1979).*

(Continued)

*Primary Examiner*—William K Cheung
(74) *Attorney, Agent, or Firm*—Al W. Payne (57) ABSTRACT

A polymerization reactor having at least three side wall surfaces and a bottom wall surface forming a reservoir and at least one heat exchanger plate in fluid communication with a coolant source, wherein each of the at least one heat exchanger plate is disposed on a lid. The polymerization reactors of the present invention permit large amounts of polymer to be formed in each reactor batch. Preferably, polymers are formed in the polymerization reactor by bulk polymerization. Methods for forming polymers is also disclosed.

27 Claims, 3 Drawing Sheets

U.S. PATENT DOCUMENTS

| | | |
|---|---|---|
| 3,639,267 A | 2/1972 | Vandenberg |
| 3,644,223 A | 2/1972 | Hashimoto et al. |
| 3,669,940 A | 6/1972 | Desgurse et al. |
| 3,674,765 A | 7/1972 | Carter et al. |
| 3,684,778 A | 8/1972 | Hammer |
| 3,691,111 A | 9/1972 | Takaoka et al. |
| 3,700,707 A | 10/1972 | Durst et al. |
| 3,711,576 A | 1/1973 | Hwa |
| 3,725,378 A | 4/1973 | Chamberlin |
| 3,755,268 A | 8/1973 | Fritze |
| 3,773,470 A | 11/1973 | Rouzier |
| 3,819,559 A | 6/1974 | Barabas |
| 3,842,904 A | 10/1974 | Gardenier |
| 3,867,361 A | 2/1975 | Calderon et al. |
| 3,879,495 A | 4/1975 | Fujii et al. |
| 3,884,857 A | 5/1975 | Ballard et al. |
| 3,903,019 A | 9/1975 | Hargis et al. |
| 3,903,201 A | 9/1975 | Childers et al. |
| 3,925,300 A | 12/1975 | Roberts et al. |
| 3,926,928 A | 12/1975 | Karayannis et al. |
| 3,932,369 A | 1/1976 | Lundberg et al. |
| 3,932,371 A | 1/1976 | Powers |
| 3,932,373 A | 1/1976 | Calderon |
| 3,943,116 A | 3/1976 | Bell |
| 3,953,398 A | 4/1976 | Kline |
| 3,957,912 A | 5/1976 | Cincera |
| 3,960,824 A | 6/1976 | Hicks |
| 3,960,987 A | 6/1976 | Kelley et al. |
| 3,962,197 A | 6/1976 | Khanna |
| 3,963,685 A | 6/1976 | Abrahams |
| 3,970,612 A | 7/1976 | Hooker |
| 3,971,767 A | 7/1976 | Setterquist |
| 3,975,331 A | 8/1976 | Spiewak |
| 3,978,032 A | 8/1976 | Manner |
| 3,985,720 A | 10/1976 | Manner |
| 3,989,768 A | 11/1976 | Milkovich et al. |
| 3,991,262 A | 11/1976 | Lal et al. |
| 4,002,815 A | 1/1977 | Minchak |
| 4,008,175 A | 2/1977 | Barter |
| 4,011,388 A | 3/1977 | Murphy et al. |
| 4,012,462 A | 3/1977 | Chaudhary |
| 4,022,954 A | 5/1977 | Kurosawa et al. |
| 4,031,300 A | 6/1977 | Thaler et al. |
| 4,038,471 A | 7/1977 | Castner |
| 4,039,722 A | 8/1977 | Dickie et al. |
| 4,041,208 A | 8/1977 | Seeger et al. |
| 4,057,672 A | 11/1977 | Creekmore et al. |
| 4,060,677 A | 11/1977 | Walker |
| 4,065,532 A | 12/1977 | Wild et al. |
| 4,069,364 A | 1/1978 | Dickie et al. |
| 4,072,790 A | 2/1978 | Creekmore et al. |
| 4,074,040 A | 2/1978 | Gropper et al. |
| 4,081,592 A | 3/1978 | Giddings et al. |
| 4,098,980 A | 7/1978 | Markle et al. |
| 4,100,227 A | 7/1978 | Bredeweg et al. |
| 4,100,228 A | 7/1978 | Dennis et al. |
| 4,103,070 A | 7/1978 | Ammons |
| 4,128,604 A | 12/1978 | Katchman et al. |
| 4,129,704 A | 12/1978 | Sanchez |
| 4,137,216 A | 1/1979 | Lemper et al. |
| 4,143,100 A | 3/1979 | Schulz et al. |
| 4,148,766 A | 4/1979 | McClain |
| 4,150,003 A | 4/1979 | McClain et al. |
| 4,151,133 A | 4/1979 | McClain |
| 4,155,899 A | 5/1979 | Lemper et al. |
| 4,160,850 A | 7/1979 | Ammons |
| 4,168,255 A | 9/1979 | Lewis et al. |
| 4,170,613 A | 10/1979 | Marubashi |
| 4,172,188 A | 10/1979 | Balle et al. |
| 4,178,263 A | 12/1979 | Priddy et al. |
| 4,187,210 A | 2/1980 | Howard |
| 4,190,718 A | 2/1980 | Lorenz et al. |
| 4,195,137 A | 3/1980 | Walker |
| 4,203,880 A | 5/1980 | Stoloff et al. |
| 4,205,141 A | 5/1980 | Liebig et al. |
| 4,212,719 A | 7/1980 | Osada et al. |
| 4,215,022 A | 7/1980 | Buckley et al. |
| 4,223,114 A | 9/1980 | Suling et al. |
| 4,225,567 A | 9/1980 | Halasa et al. |
| 4,226,846 A | 10/1980 | Schulz et al. |
| 4,226,956 A | 10/1980 | Schulz et al. |
| 4,229,547 A | 10/1980 | Cohen et al. |
| 4,230,772 A | 10/1980 | Swift et al. |
| 4,233,424 A | 11/1980 | Suling et al. |
| 4,239,879 A | 12/1980 | Fabris et al. |
| 4,241,197 A | 12/1980 | Steffen et al. |
| 4,256,636 A | 3/1981 | Roos et al. |
| 4,259,458 A | 3/1981 | Robeson |
| 4,259,465 A | 3/1981 | Barabas |
| 4,260,712 A | 4/1981 | Aggarwal et al. |
| 4,263,418 A | 4/1981 | Steffen et al. |
| 4,283,511 A | 8/1981 | Ueno et al. |
| 4,283,512 A | 8/1981 | Matsushima et al. |
| 4,286,078 A | 8/1981 | Botsch et al. |
| 4,289,678 A | 9/1981 | Calder et al. |
| 4,289,825 A | 9/1981 | Kolycheck et al. |
| 4,337,189 A | 6/1982 | Bromley et al. |
| 4,358,572 A | 11/1982 | Mack et al. |
| 4,376,847 A | 3/1983 | Ishida et al. |
| 4,380,617 A | 4/1983 | Minchak et al. |
| 4,410,659 A | 10/1983 | Lee et al. |
| 4,411,804 A | 10/1983 | DeVries et al. |
| 4,419,465 A | 12/1983 | Backhouse et al. |
| 4,419,488 A | 12/1983 | Fukumoto et al. |
| 4,435,553 A | 3/1984 | Throckmorton et al. |
| 4,451,618 A | 5/1984 | Okamoto |
| 4,451,633 A | 5/1984 | Brownscombe et al. |
| 4,452,960 A | 6/1984 | Throckmorton |
| 4,461,868 A | 7/1984 | Lindner et al. |
| 4,463,137 A | 7/1984 | Bodolus et al. |
| 4,464,495 A | 8/1984 | Brown |
| 4,477,622 A | 10/1984 | Sanderson et al. |
| 4,482,608 A | 11/1984 | Isbrandt et al. |
| 4,485,211 A | 11/1984 | Okamoto |
| 4,503,204 A | 3/1985 | Bingham et al. |
| 4,507,342 A | 3/1985 | Kielbania, Jr. |
| 4,507,414 A | 3/1985 | McRowe |
| 4,508,606 A | 4/1985 | Andrade et al. |
| 4,508,640 A | 4/1985 | Kanda et al. |
| 4,520,183 A | 5/1985 | Subramanian |
| 4,536,545 A | 8/1985 | Olener et al. |
| 4,537,933 A | 8/1985 | Walker et al. |
| 4,547,323 A | 10/1985 | Carlson |
| 4,547,428 A | 10/1985 | Bekker et al. |
| 4,562,229 A | 12/1985 | Walker et al. |
| 4,587,297 A | 5/1986 | Walker et al. |
| 4,588,776 A | 5/1986 | Bekker et al. |
| 4,605,704 A | 8/1986 | Eastman et al. |
| 4,605,721 A | 8/1986 | Hawkins et al. |
| RE32,261 E | 10/1986 | Hirota et al. |
| 4,619,983 A | 10/1986 | Yamabe et al. |
| 4,629,743 A | 12/1986 | Hong |
| 4,636,458 A | 1/1987 | Wenzel et al. |
| 4,663,405 A | 5/1987 | Throckmorton |
| 4,692,498 A | 9/1987 | Bodolus et al. |
| 4,695,608 A | 9/1987 | Engler et al. |
| 4,701,510 A | 10/1987 | Minchak et al. |
| 4,713,444 A | 12/1987 | Matsuyama et al. |
| 4,716,205 A | 12/1987 | Klabunde |
| 4,728,545 A | 3/1988 | Kurauchi et al. |
| 4,728,571 A | 3/1988 | Clemens et al. |
| 4,737,410 A | 4/1988 | Kantner |
| 4,749,757 A | 6/1988 | Schram et al. |
| 273,090 A | 7/1988 | Kamath |

| | | | | | |
|---|---|---|---|---|---|
| 4,758,608 A | 7/1988 | Collins et al. | 5,202,398 A | 4/1993 | Antberg et al. |
| 4,759,991 A | 7/1988 | Kanno et al. | 5,204,380 A | 4/1993 | Seyferth et al. |
| 4,763,133 A | 8/1988 | Takemura et al. | 5,204,429 A | 4/1993 | Kaminsky et al. |
| 4,775,702 A | 10/1988 | Cozens | 5,208,304 A | 5/1993 | Waymouth |
| 4,777,230 A | 10/1988 | Kamath | 5,208,305 A | 5/1993 | Grootaert |
| 4,788,258 A | 11/1988 | Collins et al. | 5,208,357 A | 5/1993 | Mintz |
| 4,791,181 A | 12/1988 | Pickering et al. | 5,209,971 A | 5/1993 | Bubu et al. |
| 4,806,581 A | 2/1989 | Walker | 5,210,130 A | 5/1993 | Howard |
| 4,816,107 A | 3/1989 | Collins et al. | 5,210,338 A | 5/1993 | Samsel |
| 4,831,096 A | 5/1989 | MacLeay | 5,214,173 A | 5/1993 | Jordan et al. |
| 4,833,183 A | 5/1989 | Vandenberg | 5,216,095 A | 6/1993 | Dolle et al. |
| 4,833,223 A | 5/1989 | Myers | 5,218,072 A | 6/1993 | Kumar et al. |
| 4,835,236 A | 5/1989 | Grossoleil et al. | 5,219,962 A | 6/1993 | Johnson et al. |
| 4,839,456 A | 6/1989 | Kent | 5,219,964 A | 6/1993 | Albano et al. |
| 4,843,185 A | 6/1989 | Ware et al. | 5,223,467 A | 6/1993 | Razavi |
| 4,845,165 A | 7/1989 | Halasa et al. | 5,223,468 A | 6/1993 | Razavi |
| 4,847,332 A | 7/1989 | Yu | 5,225,491 A | 7/1993 | Yu |
| 4,849,572 A | 7/1989 | Chen et al. | 5,225,500 A | 7/1993 | Elder et al. |
| 4,877,860 A | 10/1989 | Collins et al. | 5,232,993 A | 8/1993 | Winter et al. |
| 348,963 A | 1/1990 | Lukas et al. | 5,238,892 A | 8/1993 | Chang |
| 4,899,005 A | 2/1990 | Lane et al. | 5,238,968 A | 8/1993 | Morita et al. |
| 4,902,772 A | 2/1990 | Carter et al. | 5,239,022 A | 8/1993 | Winter et al. |
| 358,182 A | 3/1990 | Greenlee et al. | 5,240,894 A | 8/1993 | Burkhardt et al. |
| 4,906,797 A | 3/1990 | Lane et al. | 5,240,972 A | 8/1993 | Kumar et al. |
| 4,913,964 A | 4/1990 | Fujii et al. | 5,241,025 A | 8/1993 | Hlatky et al. |
| 4,920,182 A | 4/1990 | Manser et al. | 5,243,001 A | 9/1993 | Winter et al. |
| 4,925,903 A | 5/1990 | Myers | 5,243,002 A | 9/1993 | Razavi |
| 4,937,312 A | 6/1990 | Collins et al. | 5,252,384 A | 10/1993 | Bothe et al. |
| 4,954,400 A | 9/1990 | Collins et al. | 5,252,677 A | 10/1993 | Tomita et al. |
| 4,959,408 A | 9/1990 | Grant | 5,254,394 A | 10/1993 | Bothe et al. |
| 405,786 A | 1/1991 | Ballard et al. | 5,256,745 A | 10/1993 | Grootaert |
| 4,981,696 A | 1/1991 | Loomis et al. | 5,258,475 A | 11/1993 | Kissin |
| 4,981,827 A | 1/1991 | Ballard et al. | 5,260,389 A | 11/1993 | Resconi et al. |
| 4,988,597 A | 1/1991 | Spiewak et al. | 5,262,498 A | 11/1993 | Antberg et al. |
| 413,464 A | 2/1991 | Ballard et al. | 5,266,533 A | 11/1993 | Leung et al. |
| 413,465 A | 2/1991 | Ballard et al. | 5,272,238 A | 12/1993 | Garnier et al. |
| 5,001,244 A | 3/1991 | Wellborn, Jr. | 5,276,220 A | 1/1994 | Samsel et al. |
| 5,004,820 A | 4/1991 | Buchwald et al. | 5,278,264 A | 1/1994 | Spaleck et al. |
| 5,006,500 A | 4/1991 | Chang | 5,278,265 A | 1/1994 | Razavi |
| 5,026,798 A | 6/1991 | Canich | 5,279,999 A | 1/1994 | DeBoer et al. |
| 5,035,867 A | 7/1991 | Dang Vu et al. | 5,280,074 A | 1/1994 | Schreck et al. |
| 5,036,148 A | 7/1991 | Chanzy et al. | 5,281,679 A | 1/1994 | Jejelowo et al. |
| 5,037,890 A | 8/1991 | Yokoyama et al. | 5,283,300 A | 2/1994 | Haspeslagh et al. |
| 5,039,717 A | 8/1991 | Kawakami et al. | 5,292,838 A | 3/1994 | Razavi |
| 5,045,607 A | 9/1991 | Wissbrun et al. | 5,296,237 A | 3/1994 | Muller et al. |
| 5,076,659 A | 12/1991 | Bekiarian et al. | 5,296,434 A | 3/1994 | Karl et al. |
| 5,084,368 A | 1/1992 | Hirayama et al. | 5,302,733 A | 4/1994 | Diefenbach et al. |
| 5,086,024 A | 2/1992 | Crapo et al. | 5,304,523 A | 4/1994 | Razavi |
| 5,086,025 A | 2/1992 | Chang | 5,304,614 A | 4/1994 | Winter et al. |
| 5,086,134 A | 2/1992 | Antberg et al. | 5,304,622 A | 4/1994 | Ikai et al. |
| 5,089,295 A | 2/1992 | McNeil | 5,308,811 A | 5/1994 | Suga et al. |
| 5,089,576 A | 2/1992 | Saya et al. | 5,308,815 A | 5/1994 | Sangokoya |
| 5,102,401 A | 4/1992 | Lambert et al. | 5,308,817 A | 5/1994 | Reddy et al. |
| 5,124,402 A | 6/1992 | Laughner et al. | 5,314,957 A | 5/1994 | Asanuma et al. |
| 5,126,404 A | 6/1992 | Eckel et al. | 5,314,973 A | 5/1994 | Welborn, Jr. |
| 5,130,369 A | 7/1992 | Hughes et al. | 5,322,902 A | 6/1994 | Schreck et al. |
| 5,130,374 A | 7/1992 | Cozens et al. | 5,324,801 A | 6/1994 | Brekner et al. |
| 5,145,374 A | 9/1992 | Stansbury | 5,326,835 A | 7/1994 | Ahvenainen et al. |
| 5,147,955 A | 9/1992 | Lindner et al. | 5,328,969 A | 7/1994 | Winter et al. |
| 5,149,757 A | 9/1992 | Kantor et al. | 5,329,031 A | 7/1994 | Miyake et al. |
| 5,156,913 A | 10/1992 | Collins et al. | 5,330,948 A | 7/1994 | Marks et al. |
| 5,159,003 A | 10/1992 | Baghail | 5,332,706 A | 7/1994 | Nowlin et al. |
| 5,162,445 A | 11/1992 | Powers et al. | 5,334,677 A | 8/1994 | Razavi et al. |
| 5,164,282 A | 11/1992 | Mahabadi | 5,336,795 A | 8/1994 | Lisowsky |
| 5,183,867 A | 2/1993 | Wellborn, Jr. | 5,349,032 A | 9/1994 | Miyake et al. |
| 5,185,405 A | 2/1993 | Nishida | 5,349,100 A | 9/1994 | Mintz |
| 5,194,365 A | 3/1993 | Goodin et al. | 5,350,653 A | 9/1994 | Shoshi et al. |
| 5,194,471 A | 3/1993 | Hartitz | 5,350,817 A | 9/1994 | Winter et al. |
| 5,194,619 A | 3/1993 | Reuschling et al. | 5,359,015 A | 10/1994 | Jejelowo |
| 5,196,489 A | 3/1993 | Ballard et al. | 5,360,921 A | 11/1994 | Kiso et al. |
| 5,198,401 A | 3/1993 | Turner et al. | 5,362,824 A | 11/1994 | Furtek et al. |
| 5,200,468 A | 4/1993 | Pickton | 5,371,053 A | 12/1994 | Agapiou et al. |
| 5,200,537 A | 4/1993 | Lee et al. | 5,371,158 A | 12/1994 | Breckner et al. |

| | | |
|---|---|---|
| 5,371,259 A | 12/1994 | Meier et al. |
| 5,372,980 A | 12/1994 | Davis |
| 5,373,072 A | 12/1994 | Chang |
| 5,374,700 A | 12/1994 | Tsutsui et al. |
| 5,374,752 A | 12/1994 | Winter et al. |
| 5,376,697 A | 12/1994 | Johnston et al. |
| 5,384,298 A | 1/1995 | Inahara et al. |
| 5,384,299 A | 1/1995 | Turner et al. |
| 5,387,568 A | 2/1995 | Ewen et al. |
| 5,391,529 A | 2/1995 | Sangokoya |
| 5,391,629 A | 2/1995 | Turner et al. |
| 5,391,790 A | 2/1995 | Rohrmann et al. |
| 5,393,851 A | 2/1995 | Ewen et al. |
| 5,395,810 A | 3/1995 | Shamshoum et al. |
| 5,397,757 A | 3/1995 | Mink et al. |
| 5,399,450 A | 3/1995 | Matsushima et al. |
| 5,399,636 A | 3/1995 | Alt et al. |
| 5,407,835 A | 4/1995 | Adamczyk et al. |
| 5,407,882 A | 4/1995 | Yamada et al. |
| 5,416,178 A | 5/1995 | Winter et al. |
| 5,416,179 A | 5/1995 | Welch et al. |
| 5,420,320 A | 5/1995 | Zenk et al. |
| 5,422,325 A | 6/1995 | Jejelowo et al. |
| 5,422,409 A | 6/1995 | Brekner et al. |
| 5,427,991 A | 6/1995 | Turner |
| 5,432,242 A | 7/1995 | Baron |
| 5,434,115 A | 7/1995 | Yamada et al. |
| 5,436,305 A | 7/1995 | Alt et al. |
| 5,439,995 A | 8/1995 | Bailly et al. |
| 5,439,996 A | 8/1995 | Baird et al. |
| 5,441,920 A | 8/1995 | Welborn, Jr. |
| 5,442,019 A | 8/1995 | Agapiou et al. |
| 5,442,020 A | 8/1995 | Davis |
| 5,444,125 A | 8/1995 | Tomita et al. |
| 5,444,145 A | 8/1995 | Brant et al. |
| 5,446,221 A | 8/1995 | Struglinski |
| 5,449,732 A | 9/1995 | Smith et al. |
| 5,504,131 A | 4/1996 | Smith et al. |
| 5,504,132 A | 4/1996 | Smith et al. |
| 5,539,044 A | 7/1996 | Aysen et al. |
| 5,541,270 A | 7/1996 | Chinh et al. |
| 5,559,164 A | 9/1996 | Babu et al. |
| 5,595,001 A | 1/1997 | Schutte et al. |
| 5,644,007 A | 7/1997 | Davidson et al. |
| 5,705,577 A | 1/1998 | Rossi et al. |
| 5,712,365 A | 1/1998 | Arai et al. |
| 5,716,487 A * | 2/1998 | Sumerak ..................... 156/359 |
| 5,962,622 A | 10/1999 | Darnell et al. |
| 6,015,779 A | 1/2000 | Eaton et al. |
| 6,160,036 A | 12/2000 | Kommareddi et al. |
| 6,168,765 B1 | 1/2001 | Romatier et al. |
| 6,320,000 B1 * | 11/2001 | Hurry et al. ..................... 526/67 |

FOREIGN PATENT DOCUMENTS

| | | | |
|---|---|---|---|
| CA | | 2118926 | 4/1993 |
| DE | | 19612226 A | 10/1996 |
| DE | 198 41 843 A1 | | 3/2000 |
| EP | | 0005215 A | 11/1979 |
| EP | | 0108156 A | 5/1984 |
| GB | | 2054819 A * | 2/1981 |
| WO | WO9207013 | | 4/1992 |
| WO | WO9207014 | | 4/1992 |
| WO | WO9314852 | | 8/1993 |
| WO | WO9319101 | | 9/1993 |
| WO | WO9321239 | | 10/1993 |
| WO | WO9322355 | | 11/1993 |
| WO | WO9324423 | | 12/1993 |

OTHER PUBLICATIONS

Miscellaneous Patent Search, pp. 1-77, dated Aug. 9, 2001.
Miscellaneous Patent Search, pp. 1-204, dated Aug. 13, 2001.
US 5,242,876, 09/1993, Shamshoum et al. (withdrawn)

* cited by examiner

BULK POLYMERIZATION REACTOR METHODS

RELATED APPLICATION

This application claims the benefit of U.S. Provisional Patent Application Ser. No. 60/297,931, filed Jun. 13, 2001.

BACKGROUND OF THE INVENTION

1. Field of the Invention

This invention relates to reactors for conducting polymerization of monomers, and in particular, bulk polymerization reactors for conducting polymerization of alpha-olefin monomers.

2. Description of Related Art

Formation of polymers from various monomers is a well-known art. As is also well known in the art, the polymerization reactor in which the polymers are formed from the monomers have certain inherent limitations to efficiently form the polymers. A major inherent limitation is the removal of heat from the polymerization reactor created by the chemical reaction between the monomers and the catalyst during formation of the polymers. To overcome this problem, cooling systems have been designed to encase the polymerization reactor in an attempt to remove the heat from the polymerization reactor. Additionally, cooling additives may be included in the polymerization reaction mixture in the polymerization reactor.

Both of these prior attempts, however, have various shortcomings. For example, the use of cooling systems outside the polymerization reactor do not efficiently and effectively remove heat from the polymerization reactor, especially for the center most region of the polymerization reactor. Accordingly, the size of the polymerization reactor must be small and limited amounts of polymer may be formed in each reactor batch. Additionally, with respect to the addition of cooling additives to the polymerization reactants, these cooling additives can have an adverse effect on the quality of the polymer as well as increasing the cost associated with forming the polymer.

In other prior attempts, as discussed in U.S. Pat. Nos. 5,449,732, entitled Solvent Free Oil Soluble Drag Reducing Polymer Suspension, 5,504,131, entitled Solvent Free Oil Soluble Drag Reducing Polymer Suspension, and 5,504,132, entitled Solvent Free Oil Soluble Drag Reducing Polymer Suspension, the polymerization reactor is a crystalline, hydrocarbon-insoluble organic polymer reaction enclosure capable of substantially preventing passage of oxygen and water, i.e., plastic bags. Use of these plastic bags permits the polymerization reaction to be carried out without a cooling system or addition of cooling additives. However, because the plastic bags are not provided with any assistance in the removal of heat from the polymerization reaction, only small amounts of polymer reactants, e.g., monomer and catalyst, can be included in each plastic bag. As such, only small amounts of polymer can be formed in each of this type of polymerization reactor. Further, the plastic bags can not be easily separated from the polymer, and thus, are not re-useable.

Accordingly, prior to the development of the present invention, there has been no polymerization reactor or process for forming polymers, which: effectively remove heat away from the polymerization reactor; permit the formation of a large amount of polymer in each polymerization reactor; do not require the addition of cooling additives; and permit the use of a re-useable polymerization reactor. Therefore, the art has sought a polymerization reactor and a process for forming polymers, which: effectively remove heat away from the polymerization reactor; permit the formation of a large amount of polymer in each polymerization reactor; do not require the addition of cooling additives; and permit the use of a re-useable polymerization reactor.

SUMMARY OF INVENTION

In accordance with the invention, the foregoing advantages have been achieved through the present polymerization method for polymerization of olefins comprising: adapting a reservoir having at least three side wall surfaces and a bottom wall surface thereby forming a reservoir cavity; adapting at least one heat exchanger plate in fluid communication with a coolant source; and adapting a lid having a top wall surface and an inner wall surface, wherein the at least one heat exchanger plate is disposed along inner wall surface.

A further feature of the polymerization reactor is that the polymerization reactor may comprise four side wall surfaces. Another feature of the polymerization reactor is that each of the four side wall surfaces may have a square shape having a length and a height. An additional feature of the polymerization reactor is that two of the four side wall surfaces may have a length of at least two feet and a height of at least two feet and the other two of the four side wall surfaces may have a length of at least three feet and a height of at least two feet. Still another feature of the polymerization reactor is that the lid may be rectangularly shaped having a length and a width, the length being at least three feet and the width being at least two feet. A further feature of the polymerization reactor is that the lid may include at least two heat exchanger plates. Another feature of the polymerization reactor is that each of the at least two heat exchanger plates may be disposed at a distance of at least three inches from each other. An additional feature of the polymerization reactor is that the polymerization reactor may further comprise at least one coolant inlet manifold in fluid communication with the coolant source and at least one coolant outlet manifold in fluid communication with the coolant source. Still another feature of the polymerization reactor is that the polymerization reactor may further comprise at least one coolant inlet conduit in fluid communication with the at least one coolant inlet manifold and in fluid communication with each of the at least one heat exchanger plates, and at least one coolant outlet conduit in fluid communication with the at least one coolant outlet manifold and in fluid communication with each of the at least one heat exchanger plates. A further feature of the polymerization reactor is that the lid may include a plate hanger assembly disposed along the inner wall surface for attaching each of the at least one heat exchanger plates to the inner wall surface of the lid. Another feature of the polymerization reactor is that each of the at least one heat exchanger plates may be in fluid communication with a coolant inlet conduit and a coolant outlet conduit. An additional feature of the polymerization reactor is that each of the coolant inlet conduits may be in fluid communication with a coolant inlet manifold and each of the coolant outlet conduits may be in fluid communication with a coolant outlet manifold. Still another feature of the polymerization reactor is that the coolant inlet manifold and the coolant outlet manifold may be in fluid communication with the coolant source. A further feature of the polymerization reactor is that the reservoir may include four walls having a length, the length being at least 4 feet, and a width, the width being at least 2 feet. Another feature of the polymerization reactor is that the inner wall surface of the lid may include at least 6 heat exchanger plates. An additional feature of the polymerization reactor is that each of the at least one heat exchanger plate may include a removable film.

In accordance with the invention, the foregoing advantages have also been achieved through the present polymerization reactor for polymerization of olefins comprising: a reservoir having at least three side wall surfaces and a bottom wall surface thereby forming a reservoir cavity; a heat exchanger, the heat exchanger having a heat exchanger assembly, coolant inlet manifold in fluid communication with a coolant source, at least one coolant inlet conduit in fluid communication with at least one heat exchanger plate, at least one coolant outlet conduit in fluid communication with each of the at least one heat exchanger plate and in fluid communication with a coolant outlet manifold, the coolant outlet manifold in fluid communication with the coolant source; and a lid having a top wall surface and an inner wall surface, wherein the at least one heat exchanger plate is disposed along inner wall surface.

A further feature of the polymerization reactor is that the polymerization reactor comprises four side wall surfaces, two of the four side wall surfaces having a length of at least two feet and a height of at least two feet, the other two of the four side wall surfaces having a length of at least three feet and a height of at least two feet, and the lid is rectangularly shaped having a length and a width, the length being at least three feet and the width being at least two feet.

In accordance with the invention, the foregoing advantages have also been achieved through the present method of polymerization comprising the steps of: combining at least one monomer and at least one catalyst in a reservoir to form a polymerization reaction mixture, the reservoir having at least three side walls and a bottom wall thereby forming a reservoir cavity; inserting at least one heat exchanger plate having an exchanger cavity in fluid communication with a coolant source into the reservoir cavity thereby contacting the polymerization reaction mixture; and removing the at least one heat exchanger plate from the reaction mixture after sufficient time has passed to permit a majority of the at least one monomer to form a polymer.

A further feature of the method of polymerization is that the method may further comprise the step of disposing a removable film on each of the at least one heat exchanger plate prior to inserting the at least one heat exchanger plate into the reservoir cavity.

The polymerization reactor and process for forming polymers have the advantages of: effectively removing heat away from the polymerization reactor; permitting the formation of a large amount of polymer in each polymerization reactor; not requiring the addition of cooling additives; and permitting the use of a re-useable polymerization reactor.

While the invention will be described in connection with the preferred embodiment, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF THE INVENTION

Broadly, the polymerization reactor of the present invention includes a reservoir and a lid having a heat exchanger. When the lid is placed on the reservoir, the head exchanger is disposed within the reservoir thereby cooling, i.e., removing heat from, the contents of the reservoir.

Figure 1:
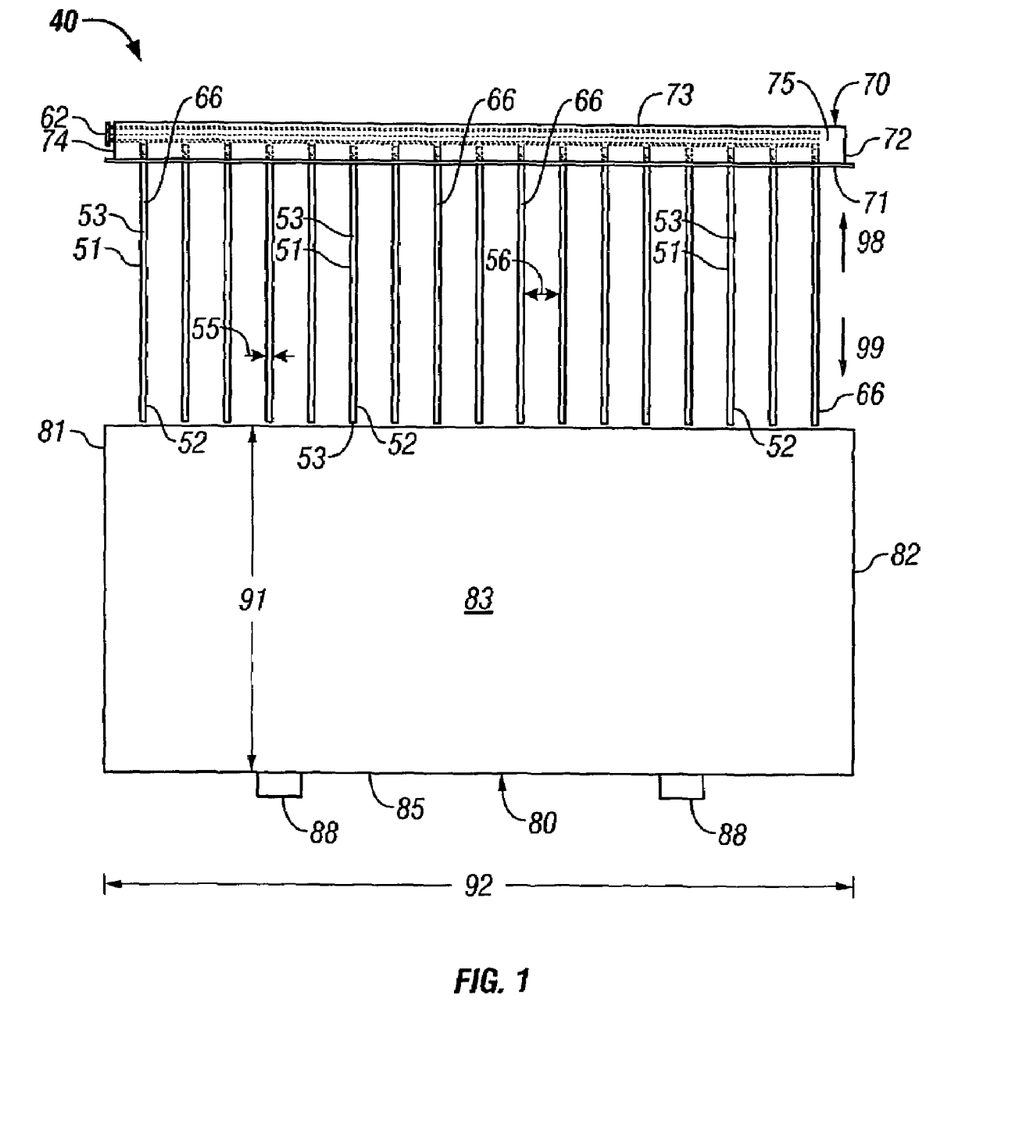
FIG. 1 is a side view of one specific embodiment of the polymerization reactor of the present invention.
Figure 2:
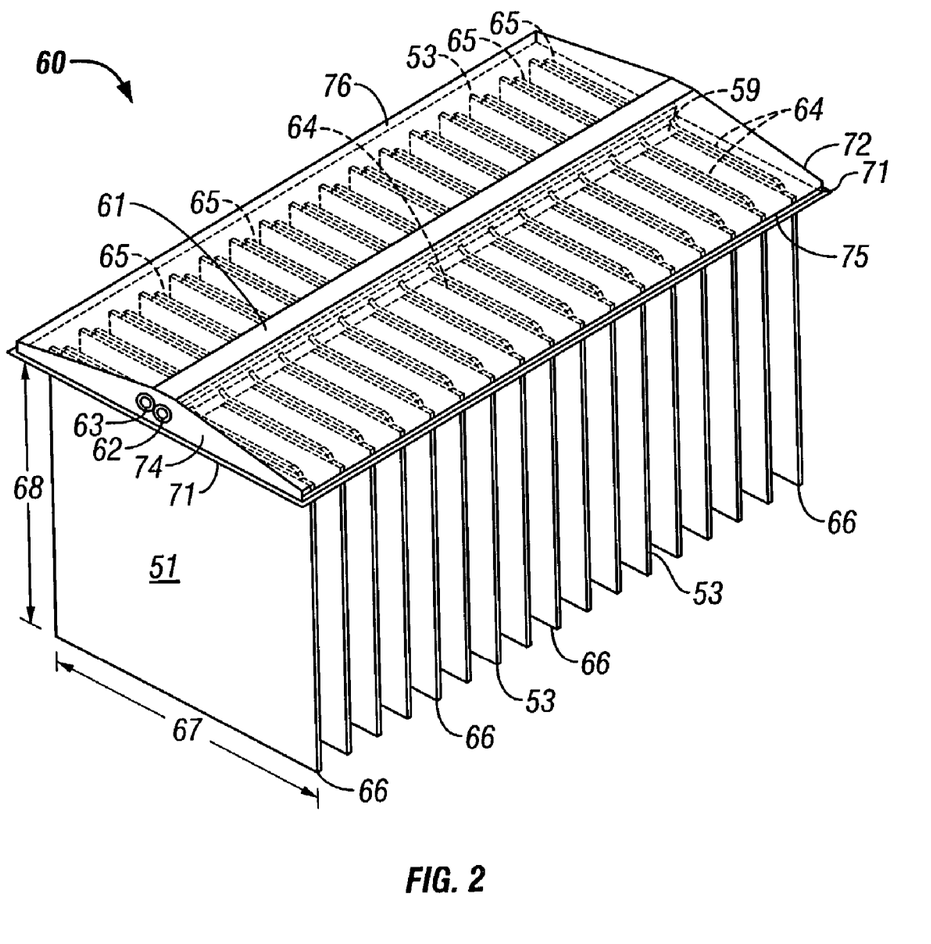
FIG. 2 is a perspective view of the heat exchanger of the polymerization reactor shown in FIG. 1.
Figure 3:
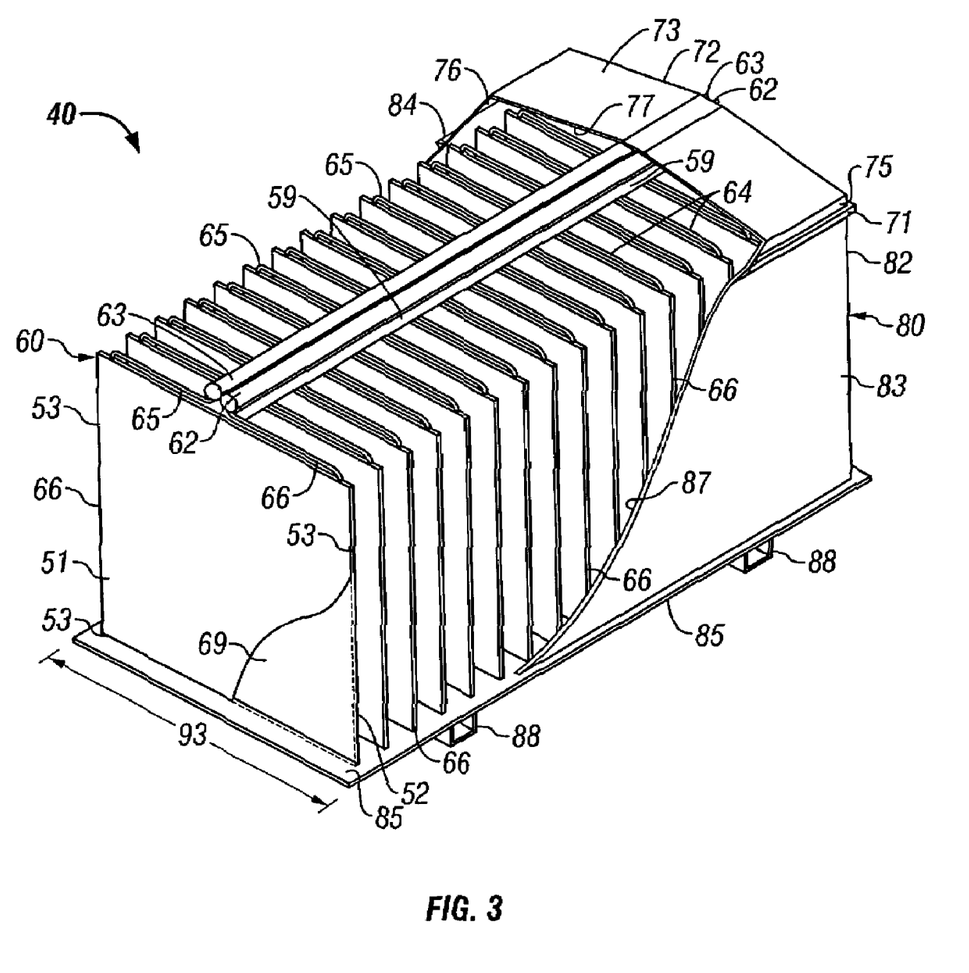
FIG. 3 is a perspective view of the polymerization reactor shown in FIG. 1.

Referring now to FIGS. 1-3, in one specific embodiment of the present invention, polymerization reactor 40 includes reservoir 80 and lid 70. Lid 70 includes heat exchanger 60. Reservoir 80 includes at least three wall surfaces and a bottom wall surface to form a cavity. As shown in FIGS. 1-3, reservoir preferably includes four side wall surfaces, 81, 82, 83, 84, and bottom wall surface 85 to form reservoir cavity 87. While it is to be understood that additional wall surfaces may be included as part of reservoir 80, thereby permitting reservoir 80 to have any desired shape, preferably reservoir 80 includes four wall surfaces thereby having a rectangular shape (FIGS. 1-3), or cube shaped.

Reservoir 80 preferably includes at least one skid 88. As shown in FIGS. 1 and 3, reservoir 80 includes two skids 88. Skids 88 permit a forklift, or other lifting device, to engage reservoir 80 so that it can be moved to any desired location, i.e., to be placed near sources of monomer that are to be charged, or transported, into reservoir 80.

As shown in FIGS. 1 and 3, reservoir 80 includes length 92, height 91, and width 93. Length 92, height 91, and width 93 may be any distance as desired by the person using polymerization reactor 40. It is to be understood, however, that generally, as length 92 increases, the number of heat exchanger plates 66 also increases, and as height 91 and width 93 increase, the dimensions of heat exchanger plate 66 increases. In one specific embodiment, length 92, height 91, and width 93 are equal and each are at least 2 feet. In this embodiment, polymerization reactor 40 is cubed shaped. In a preferred embodiment, length 92 is at least 3 feet, height 91 is at least 2 feet, and width 93 is at least 2 feet. In this preferred embodiment, polymerization reactor 40 is rectangularly shaped.

Reservoir 80 may be formed out of any material known to persons of ordinary skill in the art. Preferably, reservoir 80 is formed out of stainless steel.

Referring now to FIGS. 1-3, lid 70 includes top wall surface 73 and side wall surfaces 72, 74, 75, 76. Lip 71 may be included to provide additional strength. Lid 70 provides protection to heat exchanger 60 from the environment and prevents items from falling onto heat exchanger 60 and into reservoir 80. Lid 70 also includes an inner surface 77 to which heat exchanger 60 is attached. Lid 70 may be formed out of any material known to persons of ordinary skill in the art. Preferably, lid 70 is formed out of stainless steel.

Heat exchanger 60 preferably includes plate hanger assembly 61, coolant inlet manifold 62, coolant outlet manifold 63, at least one coolant inlet conduit 64, at least one coolant outlet conduit 65, and at least one heat exchanger plate 66 having exchanger cavity 69. Hanger assembly 61 preferably includes bracket 59 to permit attachment of each heat exchanger 66 to lid 70.

Coolant inlet manifold 62 is in fluid communication with at least one coolant inlet conduit 64 which is in fluid communication with heat exchanger plate 66. Likewise, coolant outlet manifold 63 is in fluid communication with at least one coolant outlet conduit 65 which is in fluid communication with heat exchanger plate 66. In one specific embodiment, having one heat exchanger plate 66, one of each of coolant inlet conduit 64 and coolant outlet conduit 65 is in fluid communication with coolant input manifold 62 and coolant outlet manifold 63, respectively. In other embodiments having more than one heat changer plate 66, as shown in FIGS. 1-3, each heat exchanger plate 66 includes at least one coolant inlet conduit 64 and one coolant outlet conduit 65 in fluid communication with coolant inlet manifold 62 and coolant outlet manifold 63, respectively. Therefore, coolant is permitted to pass from coolant source, through coolant inlet manifold 62, through each of the at least one coolant inlet conduits 64 into exchanger plate cavity 69 of each of the at least one heat exchanger plates 66, from the exchanger plate cavity 69 through coolant outlet conduit 65, through coolant outlet manifold 63 and back to coolant source. In so doing, heat is removed from the polymerization reaction mixture, i.e., the polymerization reaction mixture is cooled.

As discussed above, coolant inlet manifold 62 and coolant output manifold 63 are in fluid communication with coolant source. Acceptable coolant sources include, but are not limited to, refrigeration units readily known to persons of ordinary skill in the art employing water, water-glycol mixtures, water-alcohol mixtures, dissolved mineral salts, e.g., sodium chloride and calcium chloride, and ammonium as coolants. In this arrangement, coolant may be circulated from the coolant source, through a conduit, e.g., pipe or flexible hose (not shown), into coolant inlet manifold 61. Coolant is then permitted to enter coolant inlet conduit 64 and into exchanger cavity 69 of each heat exchanger plate 66.

Coolant then is permitted to exit each exchanger cavity 69 of each heat exchanger plate 66 through coolant outlet conduit 65 and into coolant outlet manifold 63. Coolant is then transported back to coolant source from coolant outlet manifold 65 through a conduit, e.g., pipe or flexible hose (not shown) to be recharged, i.e., cooled, and circulated back through heat exchanger 60.

Referring now to FIGS. 1-2, each heat exchanger plate 66 is formed from front wall surface 51, back wall surface 52, and at least one side wall surface 53 to form cavity 69. Heat exchanger plate 66 also includes length 67, width 68, and thickness 55. Heat exchanger plate 66 may be any shape and formed out of any material desired or necessary to provide sufficient area to cool the polymerization reaction mixture in reservoir 80. Preferably, heat exchanger plate 66 is formed from aluminum. As shown in FIGS. 1-3, each heat exchanger plate 66 includes four side wall surfaces 53 although it is to be understood that heat exchanger plate 66 may be circularly shaped. In embodiments having more than one heat exchanger plate 66, each heat exchanger plate is disposed at a distance 56 from the next heat exchanger plate 66.

In a preferred embodiment, each heat exchanger plate 66 includes a removable film, e.g., plastic sheath, to prevent polymer formed in reservoir 80 during polymerization from adhering to each heat exchanger plate 66. Suitable removable films include plastic sheeting, plastic sheath, a spray-on non-stick substance that is incapable of being polymerized by the polymerization reaction mixture, for example, because the spray-on non-stick substance has a melting point higher than the temperature of the polymerization reaction mixture.

The number of heat exchanger plates 66 present in each embodiment of polymerization reactor 40 is determined by the size of reservoir 80. In the specific embodiment illustrated in FIGS. 1-4, reservoir 80 includes length 92 of 8 feet, 3 inches, height 91 of 4 feet, 1 inch, and width 93 of 4 feet, 3 inches, and each heat exchange plate 66 includes length 67 of 4 feet, width 68 of 4 feet, and thickness 55 of approximately ⅞ inch. Seventeen heat exchanger plates 66 are disposed along plate hanger assembly 61 with distance 56 between each heat exchanger plate of approximately $4^{13/16}$ inches. It is to be understood that all of the foregoing dimensions may be altered as desired or necessary to provide sufficient cooling of the polymerization reaction mixture and to optimize polymer functionality.

The polymerization reactors 40 of the present invention may be used to polymerize monomers into polymers, and in particular, alpha olefin monomers into polyalphaolefins. As mentioned above, numerous polymerization methods, reactants, i.e., monomers, catalysts, cocatalysts, are known to persons of ordinary skill in the art. Additionally, bulk polymerization methods are known to persons of ordinary skill in the art. However, none of these known polymerization methods have been conducted in the polymerization reactors 80 discussed above.

In one specific embodiment of the present method for polymerization, at least one monomer and at least one catalyst are combined to form a polymerization reaction mixture in reservoir 80. Lid 80 having at least one heat exchanger plate 66 is then disposed on top of reservoir 80 to protect the polymerization reaction mixture from the environment. During placement of lid 70, each of the at least one heat exchanger plates 66 are inserted into reservoir 80, and thus, the polymerization reaction mixture. Preferably, lid 70 is lowered in the direction of arrow 99 during insertion of each of the at least one heat exchanger plates 66 into the polymerization reaction mixture. Coolant is then permitted to passing from the coolant source and into, and then out of, each exchanger cavity 69 of each of the at least one heat exchanger plates 66. During circulation of coolant through each heat exchanger plate 66, the polymerization reaction mixture is cooled. Each heat exchanger plate 66 is permitted to contact the polymerization reaction mixture for a length of time necessary for a majority of the monomers to be polymerized into polymer. Lid 70 may then be moved in the direction of arrow 98 for removal of each of the at least one heat exchanger plates 66 from the polymerization reaction mixture.

It is to be understood that the invention is not limited to the exact details of construction, operation, exact materials, or embodiments shown and described, as obvious modifications and equivalents will be apparent to one skilled in the art. For example, each of the heat exchanger plates may include more than one coolant inlet conduit or more than one coolant outlet conduit. The dimensions and shapes of the polymerization reactors can be easily determined by a person of ordinary skill in the art. Moreover, additional diagnostic gauges may be included as part of the polymerization reactor, e.g., for monitoring temperature during the polymerization reaction. Additionally, the shape of the heat exchanger plates may be any shaped desired or necessary due to the shape of the reservoir, e.g., circularly-shaped, rectangularly-shaped, triangularly-shaped, trapezoidally-shaped, etc. Accordingly, the invention is therefore to be limited only by the scope of the appended claims.

What is claimed is:

1. A method of bulk polymerization of at least one alpha olefin monomer to form bulk polyalphaolefin polymer, the method comprising the steps of:

combining at least one alpha olefin monomer having a mass and at least one catalyst having a mass in a reservoir cavity of a reservoir to form a polymerization reaction mixture having a combined mass within the reservoir cavity, the reservoir cavity being formed by at least three side walls and bottom wall;

inserting at least one heat exchanger plate having an exchanger cavity in fluid communication with a coolant source into the reservoir cavity thereafter contacting the combined mass of the polymerization reaction mixture with the at least one heat exchanger plate disposed within the reservoir cavity;

polymerizing the mass of the at least one alpha olefin monomer within the reservoir cavity with the at least one heat exchanger plate inserted into the reservoir cavity for achieving a conversion level of at least a majority of the mass of the alpha olefin monomer based on the combined mass of the polymerization reaction mixture to form a bulk polyalphaolefin polymer;

maintaining the polymerization reaction mixture within the reservoir cavity for removing sufficient heat from the combined mass of the polymerization reaction mixture such that the center most region of the combined mass of the polymerization reaction mixture is sufficiently cooled to form a bulk polyalphaolefin; and removing the least one heat exchanger plate from the reservoir cavity such that the at least one heat exchanger plate and the reservoir cavity comprising a the side walls and the bottom wall can be reused and, thus, voluminous amounts of bulk polyalphaolefin polymer are created.

2. The method of bulk polymerization of claim 1, further comprising the step of disposing a removable film on each of the at least one heat exchanger plate prior to inserting the at least one heat exchanger plate into the reservoir cavity.

3. The method of bulk polymerization of claim 1, wherein the reservoir cavity is formed by four side wall surfaces.

4. The method of bulk polymerization of claim 1, wherein the at least one heat exchanger plate is disposed along an inner wall surface of a lid.

5. The method of bulk polymerization of claim 4, wherein the reservoir cavity is formed by four side wall surfaces.

6. The method of bulk polymerization of claim 5, wherein each of the four side wall surfaces of the reservoir cavity has a square shape having a length and a height.

7. The method of bulk polymerization of claim 5, wherein two of the four side wall surfaces of the reservoir cavity include a length of at least two feet and height of at least two feet; and the other two of the four side wall surfaces of the reservoir cavity include a length of at least three feet and a height of at least two feet.

8. The method of bulk polymerization of claim 7, wherein the lid is a rectangularly shaped having a length and a width the length being at least three feet and the width being at least two feet.

9. The method of bulk polymerization of claim 4, wherein the lid includes at least two heat exchanger plates.

10. The method of bulk polymerization of claim 9, wherein each of the at least two heat exchanger plates are disposed at a distance of at least three inches from each other.

11. The method of bulk polymerization of claim 4, wherein the lid includes a plate hanger assembly disposed along the inner wall surface for attaching each or the at least one heat exchanger plates to the inner wall surface of the lid.

12. The method of bulk polymerization of claim 4, wherein each of the at least one heat exchanger plates is in fluid communication with a coolant inlet conduit and a coolant outlet conduit, thereby facilitating coolant to pass into and out of each of the at least one heat exchanger plates.

13. The method of bulk polymerization of claim 12, wherein each of the coolant inlet conduits is in fluid communication with a coolant inlet manifold and each of the coolant outlet conduits is in fluid communication with a coolant outlet manifold.

14. The method of bulk polymerization of claim 13, wherein the coolant inlet manifold and the coolant outlet manifold are in fluid communication with the coolant source.

15. The method of bulk polymerization of claim 4, wherein the inner wall surface of the lid includes at least 6 heat exchanger plates.

16. The method of bulk polymerization of claim 4, wherein the lid includes a heat exchanger, the heat exchanger having a heat exchanger assembly, a coolant inlet manifold in fluid communication with a coolant source, at least one coolant inlet conduit in fluid communication with at least one heat exchanger plate, at least one coolant outlet conduit in fluid communication with each of the at least one heat exchanger plates and in fluid communication with a coolant outlet manifold, the coolant outlet manifold being in fluid communication with the coolant source.

17. The method of bulk polymerization of claim 16, wherein the reservoir cavity is formed by four side wall surfaces, two of the four side wall surfaces of the reservoir cavity having a length of at least two feet and a height of at least two feet, the other two of the four side wall surfaces of the reservoir cavity having a length of at least three feet and a height of at least two feet, and the lid is rectangularly shaped having a length and a width, the length at least three feet and width being at least two feet.

18. The method of bulk polymerization of claim 4, wherein a removable film is disposed on at least one of the at least one heat exchanger plates prior to contacting said at least one of the at least one heat exchanger plates with the polymerization reaction mixture.

19. The method of bulk polymerization of claim 16, further comprising at least one coolant inlet manifold in fluid communication with the coolant source and at least one coolant outlet manifold in fluid communication with the coolant source.

20. The method of bulk polymerization of claim 19, further comprising at least one coolant inlet conduit in fluid communication with the at least one coolant inlet manifold and in fluid communication with each of the at least one heat exchanger plates, and at least one coolant outlet conduit in fluid communication with the at least one coolant outlet manifold and in fluid communication with each of the at least one heat exchanger plates.

21. The method of bulk polymerization of claim 1, wherein the reservoir cavity is formed by four walls, each of the four walls having a length and a width, the length being at least 4 feet and the width being at least 2 feet.

22. The method of bulk polymerization of claim 1, wherein a removable film is disposed on at least one of the least one heat exchanger plates prior to contacting said at least one of the at least one heat exchanger plates with the polymerization reaction mixture.

23. The method of bulk polymerization of claim 1, wherein the reservoir further includes a lid, and the lid is placed over the reservoir cavity to close the reservoir cavity prior to forming the polymerization reaction mixture.

24. A method of bulk polymerization of at least one alpha olefin monomer to form bulk polyalphaolefin polymer having designed properties, the method comprising the steps of:

forming a reservoir cavity comprising a plurality of side walls and a bottom wall, inserting into the reservoir cavity at least one heat exchanger plate, the heat exchanger plate comprising an exchanger cavity in fluid communication with a coolant source and a plurality of exterior surfaces, combining at least one alpha olefin monomer having a mass and at least one catalyst having a mass to form an exothermic polymerization reaction mixture having a combined mass, injecting the combined mass of the polymerization reaction mixture into the reservoir cavity, dispersing the combined mass of the polymerization reaction mixture among the side walls, the bottom and the plurality of exterior surfaces of the heat exchanger plate such that the center most region of the combined mass of the polymerization reaction mixture is sufficiently cooled to synthesize bulk amounts of polyalphaolefin polymer with the designed properties, removing sufficient heat from the combined mass of the polymerization reaction mixture within the reservoir to control the exothermic polymerization reaction of the combined mass of the polymerization reaction mixture for maintaining a temperature suitable for production of polyalphaolefin polymer with the designed properties, and for a time sufficient to obtain such polymer, removing the at least one heat exchanger plate from the reservoir cavity for disengaging the at least one heat exchanger plate from the bulk polyalphaolefin polymer such that the at least one heat exchanger plate can be reused, and, removing the bulk polyalphaolefin polymer from the reservoir cavity such that the reservoir cavity comprising the plurality of side walls and the bottom wall can be reused whereby voluminous amounts of polyalphaolefin polymer with the designed properties are created.

25. The method of bulk polymerization of at least one alpha olefin monomer to form bulk polyalphaolefin polymer having designed properties as defined in claim 24 wherein the step of removing sufficient heat from the combined mass of the polymerization reaction mixture further comprises achieving a conversion level of at least a majority of the mass of the at least one alpha olefin monomer based on the combined mass of the polymerization reaction mixture.

26. A method of bulk polymerization of an alpha olefin monomer to form bulk polyalphaolefin polymer having designed properties, the method comprising the steps of:

forming a reservoir cavity comprising a plurality of side walls and a bottom wall, disposing a removable film on a heat exchanger plate, the heat exchanger plate having an exchanger cavity and a plurality of exterior surfaces, the exchanger cavity is in fluid communication with a coolant source, inserting into the reservoir cavity the heat exchanger plate with the removable film disposed thereupon, combining the alpha olefin monomer having a mass and a catalyst having a mass to form an exothermic polymerization reaction mixture having a combined mass, injecting the polymerization reaction mixture into the reservoir cavity, dispersing the combined mass of the polymerization reaction mixture among the side walls, the bottom and the plurality of exterior surfaces of the heat exchanger plate for engagement of the combined mass of the polymerization reaction mixture with the removable film, removing sufficient heat from the combined mass of the polymerization reaction mixture such that the center most region of the combined mass of the polymerization reaction mixture is sufficiently cooled to synthesize bulk amounts of polyalphaolefin polymer with the designed properties, continuing removing heat from the combined mass of the polymerization reaction mixture for a length of time necessary for the alpha olefin monomer to be polymerized into bulk polyalphaolefin polymer with the designed properties, withdrawing the heat exchanger plate from the reservoir cavity for disengaging the heat exchanger plate from the removable film and thus from the bulk polyalphaolefin polymer such that the heat exchanger plate can be reused, and, removing the bulk polyalphaolefin polymer from the reservoir cavity such that the reservoir cavity comprising a plurality of side walls and a bottom wall can be reused whereby voluminous amounts of polyalphaolefin polymer with the designed properties are created.

27. The method of bulk polymerization of at least one alpha olefin monomer to form bulk polyalphaolefin polymer having designed properties as defined in claim 26 wherein the step of removing sufficient heat from the combined mass of the polymerization reaction mixture further comprises achieving a conversion level of at least a majority of the mass of the alpha olefin monomer based on the combined mass of the polymerization reaction mixture.

* * * * *